United States Patent [19]

Hanada et al.

[11] Patent Number: 4,853,418

[45] Date of Patent: Aug. 1, 1989

[54] POLYURETHANE EMULSION, SHEET-LIKE POROUS MATERIAL MAKING USE OF THE EMULSION AND PRODUCTION PROCESS OF THE MATERIAL

[75] Inventors: Kazuyuki Hanada, Washinomiya; Iwao Misaizu, Ageo; Masashi Kashimura, Tokyo; Tomoko Goto, Kawaguchi; Katsumi Kuriyama, Koshigaya, all of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 229,491

[22] Filed: Aug. 8, 1988

[30] Foreign Application Priority Data

Aug. 10, 1987 [JP] Japan .................................. 62-198320

[51] Int. Cl.$^4$ .............................................. C08G 18/14
[52] U.S. Cl. ..................................... 521/154; 521/170; 524/588; 524/591; 524/700; 524/731
[58] Field of Search ................ 521/154, 170; 524/588, 524/591, 700, 731

[56] References Cited

U.S. PATENT DOCUMENTS

| 3,418,198 | 12/1968 | Einstman | 521/64 |
| 3,546,001 | 12/1970 | Giannone et al. | 427/314 |
| 3,582,396 | 6/1971 | Konig et al. | 521/64 |
| 4,086,193 | 4/1978 | Reischl | 521/137 |
| 4,746,684 | 5/1988 | Kuriyama et al. | 521/137 |

FOREIGN PATENT DOCUMENTS

| 1294711 | 11/1972 | United Kingdom . |
| 1501244 | 2/1978 | United Kingdom . |
| 2009192 | 6/1979 | United Kingdom . |

Primary Examiner—Maurice J. Welsh
Attorney, Agent, or Firm—Oblon, Spivak, McClelland, Maier & Neustadt

[57] ABSTRACT

A polyurethane emulsion is composed of an organic solvent solution of a polyurethane resin containing silicone segments and/or fluorocarbon segments as backbones and/or side chains and water emulsified in the organic solvent solution. A sheet-like porous material having a porous layer of a polyurethane resin provided on a base material is produced by using the above polyurethane emulsion to form the porous layer.

6 Claims, No Drawings

POLYURETHANE EMULSION, SHEET-LIKE POROUS MATERIAL MAKING USE OF THE EMULSION AND PRODUCTION PROCESS OF THE MATERIAL

BACKGROUND OF THE INVENTION (1) Field of the Invention

This invention relates to a polyurethane emulsion, a sheet-like porous material and a production process of the porous material. It is a primary object of this invention to provide a sheet-like porous material which is excellent in various properties such as surface smoothness, water repellancy (withstandable water pressure), stain resistance, washability, mechanical properties and vapor permeability and is also good in hand and feel.

(2) Description of the Related Art

Numerous sheet-like porous materials composed of a polyurethane resin and suited as a natural leather substitute have heretofore been known. A number of processes has also been known as their production processes. These processes may be divided roughly into wet processes and dry processes.

These processes are each accompanied by both merits and demerits and dry processes are superior from the standpoint of productivity. As such dry processes, there are known those described in Japanese Patent Publication Nos. 4380/1973 and 8742/1973, Japanese Patent Laid-Open Nos. 41063/1976, 66961/1979 and 68498/1979, etc.

Although sheet-like porous materials having excellent vapor permeability can be provided by these known processes, these sheet-like porous materials has a porous structure and corollary to this, is accompanied by drawbacks that they are inferior in surface smoothness, hand and feeling and are prone to staining.

These sheet-like porous materials contain through pores in order to have moisture permeability. As a result, they are accompanied by a further drawback that penetration of external water is easy and when they are used on a rainy day or the like, water penetrates to the inside and the inside is thus wet.

As a method for solving such drawbacks, it is widely practised to incorporate so-called flexibilizer and water repellant, such as fluorocarbon compound and fluorine compound, in the porous layer. Such flexibilizer and water repellant are compounds having a relatively low molecular weight and have poor compatibility with polyurethane resins. They hence tend to bleed out to the surface of the porous layer, thereby causing a staining problem that the surface becomes sticky and more susceptible to dust deposition.

Furthermore, the flexibilizer and water repellant are washed away when the sheet-like porous material is washed repeatedly, leading to a problem in washability that the properties imparted by the flexibilizer and water repellant, such as surface smoothness, hand and feeling, water repellancy (withstandable water pressure) and stain resistance, would be lost.

There is hence an outstanding demand for the development of a sheet-like porous material which has good surface smoothness, hand and feeling and excellent withstandable water pressure, stain resistance and washability in spite of its porous structure.

SUMMARY OF THE INVENTION

The present inventors have carried out an extensive investigation with a view toward meeting the above demand. As a result, it has been found that the use of a specific polyurethane emulsion can solve drawbacks of the conventional techniques, such as those mentioned above, and can thus provide a sheet-like porous material capable of fully meeting the abovementioned demand in the present field of art.

Namely, it has been revealed that the abovedescribed problems of the conventional art can be solved by using a specific polyurethane, namely, a polyurethane resin containing silicone segments and/or fluorocarbon segments as backbones and/or side chains for the formation of a porous layer.

In one aspect of this invention, there is thus provided a polyurethane emulsion which comprises:

an organic solvent solution of a polyurethane resin containing silicone segments and/or fluorocarbon segments as backbones and/or side chains; and water emulsified in the organic solvent solution.

In another aspect of this invention, there is also provided a sheet-like porous material having a porous layer of a polyurethane resin provided on a base material, in which the polyurethane resin has silicone segments and/or fluorocarbon segments as backbones and/or side chains.

In a further aspect of this invention, there is also provided a process for producing a sheet-like porous material by impregnating and/or coating a base material with a water-in-oil type polyurethane emulsion and then gelling and drying the emulsion. The polyurethane emulsion comprises:

an organic solvent solution of a polyurethane resin containing silicone segments and/or fluorocarbon segments as backbones and/or side chains; and water emulsified in the organic solvent solution.

In the present invention, silicone compound and/or fluorine compound as flexibilizer(s) and/or water repellant(s) are bound by covalent bonds in the polyurethane. As a result, even after the polyurethane is formed into a porous layer, the flexibilizer(s) and/or water repellant(s) do not bleed out to the surface along the passage of time and are not washed away by washing, so that excellent surface smoothness and high flexibility, withstandable water pressure, stain resistance and washability can be retained almost permanently.

The above and other objects, features and advantages of the present invention will become apparent form the following description of the invention and the appended claims.

DETAILED DESCRIPTION OF THE INVENTION AND PREFERRED EMBODIMENTS

The polyurethane resin, which is employed in this invention, primarily features this invention and contains silicone segments and/or fluorocarbon segments, is obtained by using a silicone compound having one or more reactive functional groups such as amino, epoxy, hydroxyl, carboxyl and/or thioalcohol groups and/or a fluorine compound having one or more of such functional groups as the entire or partial portion of a polyol, polyisocyanate or chain extender upon obtaining a polyurethane resin by reacting the polyol, polyisocyanate, chain extender, etc.

Upon synthesis of the polyurethane resin in the above-described manner, it is possible to synthesize a polyurethane resin containing silicone segments from a silicone compound with one or more reactive functional groups and also another polyurethane resin containing fluorocarbon segments and then to mix and use them at a suitable ratio.

As preferred examples of the silicone compound having one or more reactive organic functional groups as described above, the following compounds may be mentioned by way of example.

(1) Amino-modified silicone oils:

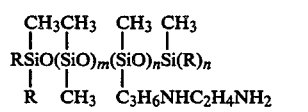

(m: 1-10, n: 2-10, R: CH₃ or OCH₃)

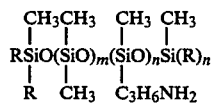

(m: 1-10, n: 2-10, R: CH₃ or OCH₃)

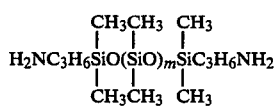

(m: 0-200)

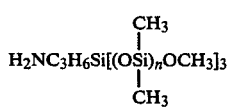

(n: 2-10)

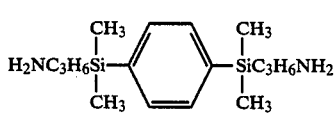

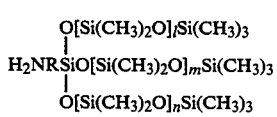

(branched sites: 2-3, R: lower alkyl, l: 2-200, m: 2-200, n: 2-200)

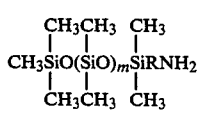

(n: 1-200, R: lower alkyl)

(2) Epoxy-modified silicone oils:

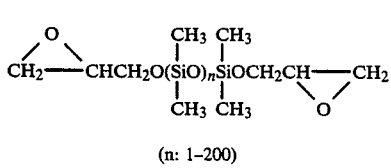

(n: 1-200)

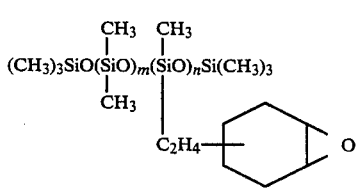

(m: 1-10, n: 2-10)

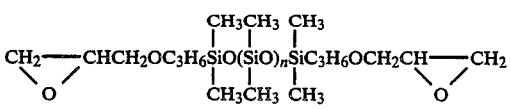

(n: 1-200)

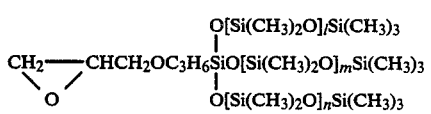

(branched sites: 2-3, R: lower alkyl, l: 2-200, m: 2-200, n: 2-200)

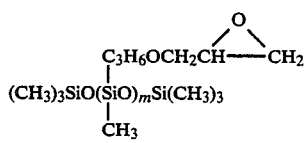

(n: 1-10)

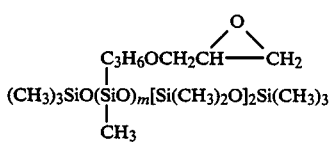

(m: 1-10, n: 2-10)

(3) Alcohol-modified silicone oils:

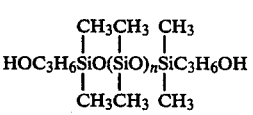

(n: 1-200)

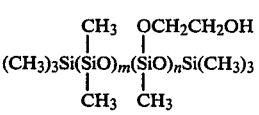

(m: 1-10, n: 2-10)

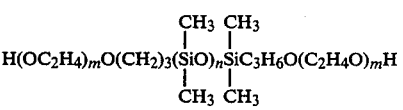

(m: 0-50, n: 0-200)

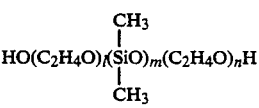

(l: 1-10, m: 10-200, n: 1-5)

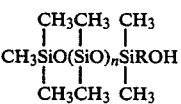

(n: 1-200, R: lower alkyl)

-continued

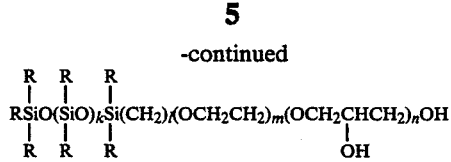

(R: alkyl, k: 1–250, l: 0–3, n: 1–3)

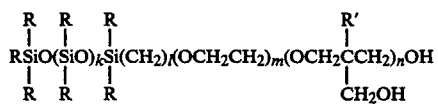

(R: alkyl, R': hydrogen or $C_{1-5}$ alkyl, k: 1–250, l: 0–5, m: 0–50, n: 1–3)

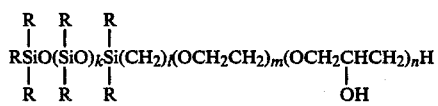

(R: alkyl, k: 1–250, l: 0–5, m: 0–50, n: 2–3)

(4) Mercapto-modified silicone oils:

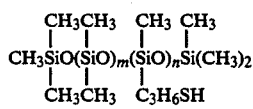

(m: 1–10, n: 2–10)

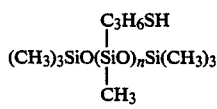

(n: 2–10)

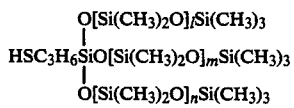

(branched sites: 2–3, R: lower alkyl, l: 2–200, m: 2–200, n: 2–200)

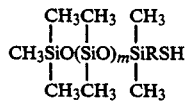

(n: 1–200, R: lower alkyl)

(5) Carboxyl-modified silicone oils:

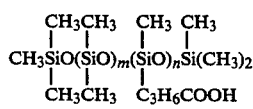

(m: 1–10, n: 2–10)

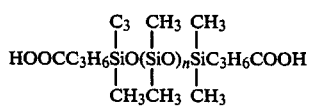

(n: 1–200)

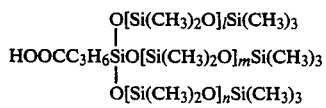

-continued (branched sites: 2–3, R: lower alkyl, l: 2–200, m: 2–200, n: 2–200)

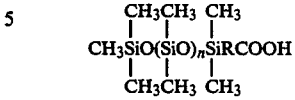

(n: 1–200, R: lower alkyl)

The following compounds may be mentioned as exemplary fluorocarbon compounds containing such reactive functional groups as described above.

(1) $H(CF_2CF_2)_nCH_2OH$ (n: 1–7)
(2) $CF_3(CF_2CF_2)_nCH_2CH_2OH$ (n: 1–10)
(3) $CF_3(CF_2CF_2)_nCOOH$ (n: 1–10)
(4) $CF_3(CF_2CF_2)_nCH_2CH_2SH$ (n: 1–10)
(5) $H(CF_2CF_2)_l(CH_2)_m(OCH_2CH_2(OH)CH_2)_nOH$ (l: 1–10, m: 1–10, n: 1–3)
(6) $F(CF_2CF_2)_l(CH_2)_m(OCH_2CH_2(OH)CH_2)_nOH$ (l: 1–10, m: 1–10, n: 1–3)

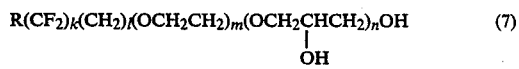  (7)

(R: hydrogen or fluorine atom, k: 2–16, l: 0–6, m: 0–3, n: 1–3)

The above silicone compounds and fluorocarbon compounds, which contain such reactive organic functional groups as described above, are merely illustrative compounds preferred in the present invention. It should therefore borne in mind that the present invention is not limited to the use of such exemplified compounds. The above exemplified compounds and other compounds are currently sold on the market and hence readily available there. They are all usable in the present invention.

Intermediates obtained respectively by reacting such silicone compounds and/or fluorocarbon compounds and polyisocyanates, which will be described subsequently, in such a way that at least either the reactive groups of the silicone compounds and/or fluorocarbon compounds or the isocyanate groups of he polyisocyanates are allowed to remain, for example, those obtained respectively by reacting bifunctional silicone compounds and/or fluorocarbon compounds and polyfunctional polyisocyanates at a ratio of excess isocyanate groups or on the contrary, those obtained respectively by reacting them at a ratio of excess reactive groups of the bifunctional silicone compounds and/or fluorocarbon compounds may be used similarly.

Where the reactive groups of silicone compounds and/or fluorocarbon compounds are hydroxyl groups, amino groups, carboxyl groups, epoxy groups and/or the like, polyesterpolyols, polyamidepolyamines, polyetherpolyols and the like obtained by reacting them with the below-described polyols, chain extenders, polycarboxylic acids or polyamines may also be used similarly.

Conventionally-known polyols for polyurethanes can all be used as polyols. Preferred examples may include those containing a hydroxyl group as a terminal group and having a molecular weight of 300–4,000, such as:

Polyethylene adipate,
Polyethylenepropylene adipate,
Polyethylenebutylene adipate,
Polydiethylene adipate,
Polybutylene adipate, Polyethylene succinate,
Polybutylene succinate,
Polyethylene sebacate,
Polybutylene sebacate,
Polytetramethylene ether glycol,
Poly-ε-caprolatonediol,
Polyhexamethylene adipate,
Carbonatepolyol,
Polypropylene glycol, etc.

Those containing polyoxyethylene chains in a suitable proportion in the above-exemplified polyols may also be mentioned as preferred polyols.

Conventionally-known organic polyisocyanates may all be used. The following polyisocyanates may be mentioned as preferred examples.
 4,4'-Diphenylmethane diisocyanate (MDI),
 Hydrogenated MDI,
 Isophorone diisocyanate,
 1,3-Xylylene diisocyanate,
 1,4-Xylylene diisocyanate,
 2,4-Tolylene diisocyanate,
 2,6-Tolylene diisocyanate,
 1,5-Naphthalene diisocyanate,
 m-Phenylene diisocyanate,
 p-Phenylene diisocyanate, etc.

Needless to say, it is also possible to use urethane prepolymers obtained by reacting these organic polyisocyanates and low molecular polyols or polyamines in such a way that terminal isocyanates are formed.

Although conventionally-known chain extenders can all be used, the following chain extenders may be mentioned as preferred examples.
 Ethylene glycol,
 Propylene glycol,
 Diethylene glycol,
 1,4-Butanediol,
 1,6-Hexanediol,
 Ethylenediamine,
 1,2-Propylenediamine,
 Trimethylenediamine,
 Tetramethylenediamine,
 Hexamethylenediamine,
 Decamethylenediamine,
 Isophoronediamine,
 m-Xylylenediamine,
 Hydrazine,
 Water, etc.

Polyurethane resins containing silicone segments and/or fluorocarbon segments and blends of polyurethane resins containing silicone segments and polyurethane resins containing fluorocarbon segments, which are obtained from such materials as mentioned above, are all usable in the present invention. Among these, preferred are those containing silicon segments and/or fluorocarbon segments in a proportion of about 0.2–50 wt.% of the resins. If the total proportion of silicon segments and/or fluorocarbon segments is smaller than about 0.2 wt.%, such a proportion is too small to achieve the objects of the present invention. On the other hand, any proportions greater than about 50 wt.% are not preferred because they result in problems such as reduced adhesion to base materials.

Their molecular weights may preferably range from 20,000 to 500,000, with 20,000–250,000 being most preferred.

Such polyurethane resins containing silicone segments and/or fluorocarbon segments can be easily obtained by any one of production processes known to date. These polyurethane resins may be prepared without any solvent or may be prepared in an organic solvent. From the process standpoint, it is advantageous to prepare them in an organic solvent useful for the preparation of polyurethane emulsions, in other words, in an organic solvent having a certain degree of miscibility with water, because the resulting reaction mixture may be used as is for the preparation of a polyurethane emulsion.

Preferable examples of such an organic solent may include methyl ethyl ketone, methyl n-propyl ketone, methyl isobutyl ketone, diethyl ketone, methyl formate, ethyl formate, propyl formate, methyl acetate, ethyl acetate, butyl acetate and the like. It is also feasible to use acetone, cyclohexanone, tetrahydrofuran, dioxane, methanol, ethanol, isopropyl alcohol, butanol, toluene, xylene, dimethylformamide, dimethylsulfoxide, perchloroethylene, trichloroethylene, methylcellosolve, butylcellosolve, cellosolve acetate, and the like. Among these organic solvents, those miscible with water without limitations or those insoluble in water are used by mixing them with other solvents and hence imparting a limitation to their miscibility with water. The above-described organic solvents may of course be used as mixed organic solvents.

When a polyurethane resin is prepared in such an organic solvent, the polyurethane resin is obtained in the form of a solution. It is convenient to adjust the solid content to a range of about 5–60 wt.% by either adding a solvent of the same or different type or removing the solvent. In the present invention, the polyurethane resin may be dissolved fully in the organic solvent or may be in the form of a dispersion in which it is contained partially or wholly as crystals. They will hereinafter be called "solutions" for the sake of brevity.

In order to prepare a polyurethane emulsion from the above-described polyurethane solution, a suitable amount of a water-in-oil type emulsifier is added to the polyurethane solution as needed. While vigorously stirring the resultant mixture, water is added in a proportion less than the saturation, for example, in an amount of about 50–500 parts by weight per 100 parts by solids weight of solution so that the polyurethane emulsion is obtained.

Any one of water-in-oil type emulsifiers known to date may be used as an emulsifier. Particularly preferred are polyurethane-based interface lubricants containing polyoxyethylene chains in a suitable proportion in the molecule. The emulsifier may be used preferably in a proportion of about 1–10 parts by weight per 100 parts by solids weight of the polyurethane resin solution.

The thus-obtained polyurethane emulsion is a cream-like fluid of a milky white color. It retains its stable state even when it is left over for several months as is. Such a polyurethane emulsion may be added with one or more of various additives, for example, additives known conventionally such as colorants, crosslinking agents, stabilizers and fillers, as needed.

As a base material usable upon production of a sheet-like porous material by using such a polyurethane emulsion, any base material may be employed, for example, a desired one of various woven fabrics, knitted fabrics, non-woven fabrics, parting papers, plastic films, metal plates, glass plates and the like.

For the application of the polyurethane emulsion to the base material, any known method may be used such as a coating technique, a dipping technique or a combination thereof. The amount of the polyurethane emulsion to be employed for impregnation and/or coating may vary in a wide range, for example, about 2–2,000 g (wet) per $m^2$ depending what end use will be made.

The gelling of the polyurethane emulsion applied on the base material and the drying of the thus-gelled polyurethane emulsion and the impregnated and/or coated base material can be achieved in much the same way as the prior art. For example, a sheet-like porous polyurethane material having excellent properties can be obtained by drying the impregnated or coated base material at a temperature of about 40°–200° C. or so.

The sheet-like porous material obtained by using such a polyurethane emulsion according to this invention has a very fine porous structure, has various excellent physical properties along with superb vapor permeability, and is hence useful as a sheet stock for various synthetic leathers and the like, in particular, as apparel, shoes, waterproof fabric, tents, wall paper, flooring, filter materials, filters for air conditioners, and the like.

It is worthy to note that the polyurethane resin in the polyurethane emulsion according to this invention contains silicone segments and/or fluorocarbon segments in the backbone and/or side chains of its molecule. As a result, even after the formation of a porous layer from the emulsion, the silicone segments and/or fluorocarbon segments in the porous layer do not bleed out to the surface of the porous layer along the passage of time, so that the sheet-like porous material can semi-permanently maintain the excellent surface smoothness, hand and feeling, withstandable water pressure, stain resistance and washability.

The present invention will hereinafter be described specifically by the following Referential Examples, Examples and Comparative Examples, in which all designations of "part" or "parts" and "%" mean part or parts by weight and wt.% unless otherwise specifically indicated.

REFERENTIAL EXAMPLE 1: (PREPARATION OF INTERMEDIATE)

While thoroughly stirring at 50° C. 175 parts of a 1:3 (by molar ratio) adduct of trimethylolpropane and tolylenediisocyanate (TDI) ("Colonate L", trade name; product of Nippon Polyurethane Industry Co., Ltd.; NCO %: 12.5; solids: 75%), 880 parts of an aminopropylterminated polydimethylsiloxane (molecular weight: 2,200) having the following structural formula were gradually added dropwise to the adduct so as to react them to each other.

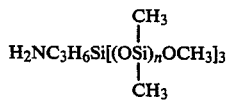

(n: a value to give the molecular weight of 2,200)

After completion of the reaction, ethyl acetate was caused to evaporate so that 976 parts of an intermediate were obtained in the form of a clear liquid.

An infrared absorption spectrum of the intermediate still indicated an absorption by free isocyanate groups at 2270 $cm^{-1}$. Another absorption by Si—O—C groups was also observed at 1090 $cm^{-1}$.

As a result of a quantitative analysis of the free isocyanate groups in the intermediate, their content was found to be 0.78% while its calculated value was 0.83%.

Accordingly, the basic structure of the intermediate is estimated to have the following formula.

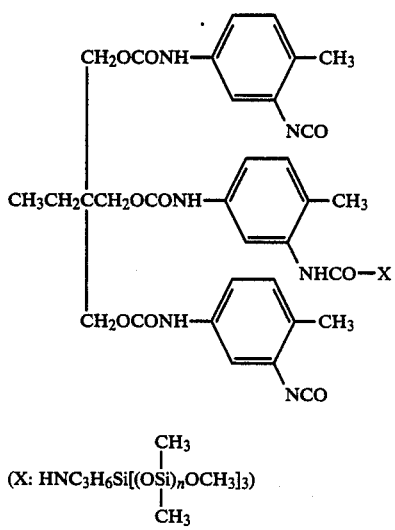

(X: $HNC_3H_6Si[(OSi)_nOCH_3]_3$)

REFERENTIAL EXAMPLE 2: (PREPARATION OF INTERMEDIATE)

Twenty-four parts of phenyl isocyanate were added to 196 parts of a hydroxypropyl-terminated polydimethylsiloxane (molecular weight: 980) having the below-described structure. They were reacted to each other at 60° C. under thorough stirring, thereby obtaining 213 parts of a reaction product in the form of a clear liquid.

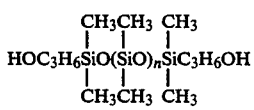

(n: a value to give the molecular weight of 980)

While thoroughly stirring at 60° C. 52 parts of a hexamethylene diisocyanate-water adduct ("Duranate 24A-100", trade name; product of Asahi Chemical Industry CO., Ltd.; NOC %: 23.5), 220 parts of the above reaction product were gradually added dropwise to the adduct so as to react them to each other, whereby 263 parts of an intermediate were obtained in the form of a colorless clear liquid.

An infrared absorption spectrum of the intermediate still indicated an absorption by free isocyanate groups at 2270 $cm^{-1}$. Another absorption by Si—O—C groups was also observed at 1090 $cm^{-1}$.

As a result of a quantitative analysis of the free isocyanate groups in the intermediate, their content was found to be 1.37% while its calculated value was 1.54%.

Accordingly, the basic structure of the intermediate is estimated to have the following formula.

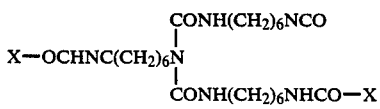

-continued

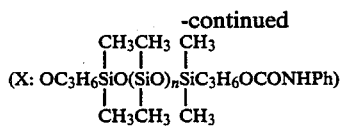
(X: OC$_3$H$_6$SiO(SiO)$_n$SiC$_3$H$_6$OCONHPh)

REFERENTIAL EXAMPLE 3: (PREPARATION OF INTERMEDIATE)

Fifteen parts of n-butylaldehyde were added to 230 parts of an aminopropyl-terminated polydimethylsiloxane (molecular weight: 1,150) having the below-described structure. They were reacted to each other at 80° C. for 3 hours under thorough stirring while taking the resulting water out of the system, thereby obtaining 238 parts of a reaction product in the form of a clear liquid.

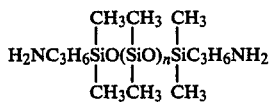

(n: a value to give the molecular weight of 1,150)

While thoroughly stirring at room temperature 186 parts of a 1:3 (by molar ratio) adduct of trimethylol propane and xylylene diisocyanate ("Takenate D110N", trade name; product of Takeda Chemical Industries, Ltd.; NCO %: 11.5; solids: 75%), 490 parts of the above reaction product were gradually added dropwise to the adduct so as to react them to each other.

After completion of the reaction, ethyl acetate was caused to evaporate so that 610 parts of an intermediate were obtained in the form of a clear liquid.

An infrared absorption spectrum of the intermediate still indicated an absorption by free isocyanate groups at 2270 cm$^{-1}$. Another absorption by Si—O—C groups was also observed at 1090 cm$^{-1}$.

As a result of a quantitative analysis of the free isocyanate groups in the intermediate, their content was found to be 1.25% while its calculated value was 1.34%.

Accordingly, the basic structure of the intermediate is estimated to have the following formula.

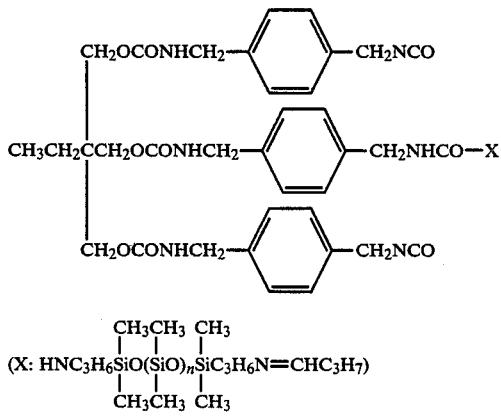

(X: HNC$_3$H$_6$SiO(SiO)$_n$SiC$_3$H$_6$N=CHC$_3$H$_7$)

REFERENTIAL EXAMPLE 4: (Preparation of Intermediate)

While thoroughly stirring at 60° C. 35 parts of 2,6-tolylene diisocyanate and 110 parts of ethyl acetate, 316 parts of a mercaptopropyl-terminated polydimethylsiloxane (molecular weight: 1,580) having the following structural formula were gradually added dropwise to the adduct so as to react them to each other.

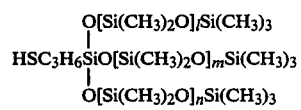

(l, m, n: values to give the molecular weight of 1,580)

After completion of the reaction, the ethyl acetate was caused to evaporate so that 340 parts of an intermediate were obtained in the form of a clear liquid.

An infrared absorption spectrum of the intermediate still indicated an absorption by free isocyanate groups at 2270 cm$^{-1}$. Another absorption by Si—O—C groups was also observed at 1090 cm$^{-1}$.

As a result of a quantitative analysis of the free isocyanate groups in the intermediate, their content was found to be 2.12% while its calculated value was 2.39%.

Accordingly, the basic structure of the intermediate is estimated to have the following formula.

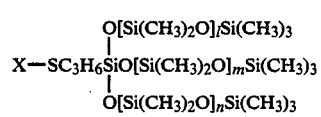

(l, m, n: values to give the molecular weight of 1,580)

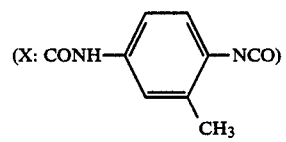

REFERENTIAL EXAMPLE 5: (Preparation of Intermediate)

While thoroughly stirring at 60° C. 160 parts of hexamethylene diisocyanate and 160 parts of ethyl acetate, 450 parts of a hydroxylpropyl-terminated polydimethylsiloxane (molecular weight: 2,250) having the following structural formula were gradually added dropwise to the adduct so as to react them to each other.

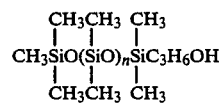

(n: a value to give the molecular weight of 2,250)

After completion of the reaction, the ethyl acetate was caused to evaporate so that 488 parts of an intermediate were obtained in the form of a clear liquid.

An infrared absorption spectrum of the intermediate still indicated an absorption by free isocyanate groups at 2270 cm$^{-1}$. Another absorption by Si—O—C groups was also observed at 1090 cm$^{-1}$.

As a result of a quantitative analysis of the free isocyanate groups in the intermediate, their content was found to be 1.52% while its calculated value was 1.67%.

Accordingly, the basic structure of the intermediate is estimated to have the following formula.

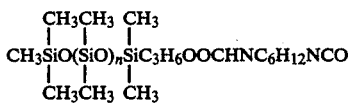

REFERENTIAL EXAMPLE 6: (Preparation of Intermediate)

While thoroughly stirring at 60° C. 52 parts of the hexamethylene diisocyanate-water adduct ("Duranate 24A-100", trade name; product of Asahi Chemical Industry Co., Ltd.; NOC %: 23.5), 53 parts of a fluorinated alcohol having the below-described structure were gradually added dropwise to the adduct so as to react them to each other, whereby 103 parts of an intermediate were obtained in the form of a colorless clear liquid.

$H(CF_2CF_2)_5OH$

An infrared absorption spectrum of the intermediate still indicated an absorption by free isocyanate groups at 2270 cm$^{-1}$. Another absorption by —CF$_2$— groups was also observed at 1190 cm$^{-1}$. As a result of a quantitative analysis of the free isocyanate groups in the intermediate, their content was found to be 2.65% while its calculated value was 2.51%.

Accordingly, the basic structure of the intermediate is estimated to have the following formula.

```
       CONH(CH2)6NCO
       |
N—CONH(CH2)6NHCOOCH2(CF2CF2)5H
       |
       CONH(CH2)6NHCOOCH2(CF2CF2)5H
```

REFERENTIAL EXAMPLE 7: (Preparation of Intermediate)

While thoroughly stirring at 50° C. 120 parts of the 1:3 (by molar ratio) adduct of trimethylolpropane and tolylenediisocyanate (TDI) ("Colonate L", trade name; product of Nippon Polyurethane Industry Co., Ltd.; NCO %: 12.5; solids: 75%), 114 parts of a fluorinated alcohol having the below-described structure were gradually added dropwise to the adduct so as to react them to each other.

$CF_3(CF_2CF_2)_3OH$

After completion of the reaction, 198 parts of an intermediate were obtained in the form of a clear liquid.

An infrared absorption spectrum of the intermediate still indicated an absorption by free isocyanate groups at 2270 cm$^{-1}$. Another absorption by —CF$_2$— groups was also observed at 1190 cm$^{-1}$. As a result of a quantitative analysis of the free isocyanate groups in the intermediate, their content was found to be 2.68% while its calculated value was 2.83%.

Accordingly, the basic structure of the intermediate is estimated to have the following formula.

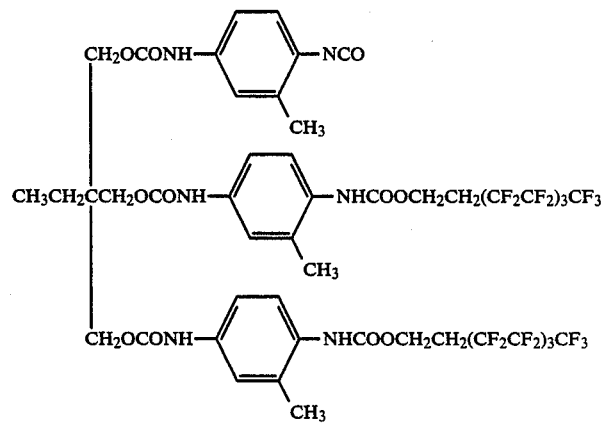

REFERENTIAL EXAMPLE 8: (Preparation of Intermediate)

While thoroughly stirring at room temperature 186 parts of the 1:3 (by molar ratio) adduct of trimethylol propane and xylylene diisocyanate ("Takenate D110N", trade name; product of Takeda Chemical Industries, Ltd.; NCO %: 11.5; solids: 75%), 172 parts of a fluorinated thiol having the below-described structure were gradually added dropwise to the adduct so as to react them to each other.

$CF_3(CF_2CF_2)_3CH_2CH_2SH$

After completion of the reaction, 320 parts of an intermediate were obtained in the form of a clear liquid.

An infrared absorption spectrum of the intermediate still indicated an absorption by free isocyanate groups at 2270 cm$^{-1}$. Another absorption by —CF$_2$— groups was also observed at 1190 cm$^{-1}$. As a result of a quantitative analysis of the free isocyanate groups in the intermediate, their content was found to be 2.51% while its calculated value was 2.69%.

Accordingly, the basic structure of the intermediate is estimated to have the following formula.

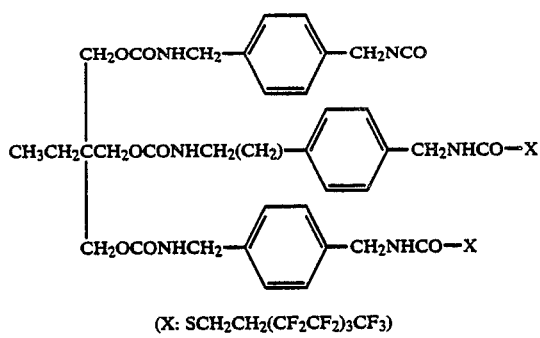

(X: SCH$_2$CH$_2$(CF$_2$CF$_2$)$_3$CF$_3$)

REFERENTIAL EXAMPLE 9

(Modification of Resin .... Side Chains)

After reacting 1,000 parts of polyethylene adipate (average molecular weight: about 1,000; hydroxyl number: 112), 144 parts of 1,4-butanediol, 1,144 parts of methyl ethyl ketone and 650 parts of diphenylmethane diisocyanate at 70° C. for 8 hours, 3,042 parts of methyl ethyl ketone were added further. The resultant mixture was rendered uniform and then cooled to room temperature under stirring, thereby obtaining a milky white polyurethane dispersion having a solid content of 30%.

Five parts of the intermediate of Referential Example 1 were added to 100 parts of the above polyurethane dispersion. They were reacted at 70° C. for 4 hours to obtain a milky white solution [hereinafter called "Modified Resin Solution (1)"] of a modified resin in which the intermediate and polyurethane resin were coupled together.

No isocyanate groups were observed by an infrared absorption analysis of the modified resin obtained above. This indicates that the intermediate was grafted on the resin.

REFERENTIAL EXAMPLE 10

(Modification of Resin .... Side Chains)

After reacting 1,000 parts of 1,4-butaneethylene adipate (average molecular weight: about 1,000; hydroxyl number: 112), 144 parts of 1,4-butanediol, 1,144 parts of methyl ethyl ketone and 650 parts of diphenylmethane diisocyanate at 70° C. for 8 hours, 3,042 parts of methyl ethyl ketone were added further. The resultant mixture was rendered uniform and then cooled to room temperature under stirring, thereby obtaining a milky white polyurethane dispersion having a solid content of 30%.

Five parts of the intermediate of Referential Example 2 were added to 100 parts of the above polyurethane dispersion. They were reacted at 70° C. for 4 hours to obtain a milky white solution [hereinafter called "Modified Resin Solution (2)"] of a modified resin in which the intermediate and polyurethane resin were coupled together.

No isocyanate groups were observed by an infrared absorption analysis of the modified resin obtained above. This indicates that the intermediate was grafted on the resin.

REFERENTIAL EXAMPLE 11

(Modification of Resin .... Side Chains)

After reacting 1,000 parts of 1,6-hexamethylene adipate (average molecular weight: about 2,000; hydroxyl number: 56), 125 parts of 1,4-butanediol, 1,200 parts of methyl ethyl ketone and 427 parts of diphenylmethane diisocyanate at 70° C. for 8 hours, 2,526 parts of methyl ethyl ketone were added further. The resultant mixture was rendered uniform and then cooled to room temperature under stirring, thereby obtaining a milky white polyurethane dispersion having a solid content of 30%.

Five parts of the intermediate of Referential Example 3 were added to 100 parts of the above polyurethane dispersion. They were reacted at 70° C. for 4 hours to obtain a milky white solution [hereinafter called "Modified Resin Solution (3)"] of a modified resin in which the intermediate and polyurethane resin were coupled together.

No isocyanate groups were observed by an infrared absorption analysis of the modified resin obtained above. This indicates that the intermediate was grafted on the resin.

REFERENTIAL EXAMPLE 12

(Modification of Resin .... Side Chains)

After reacting 1,000 parts of polytetramethylene glycol (average molecular weight: about 1,000; hydroxyl number: 112), 93 parts of ethylene glycol, 1,500 parts of methyl ethyl ketone and 625 parts of diphenylmethane diisocyanate at 70° C. for 8 hours, 2,500 parts of methyl ethyl ketone were added further. The resultant mixture was rendered uniform and then cooled to room temperature under stirring, thereby obtaining a milky white polyurethane dispersion having a solid content of 30%.

Five parts of the intermediate of Referential Example 4 were added to 100 parts of the above polyurethane dispersion. They were reacted at 70° C. for 4 hours to obtain a milky white solution [hereinafter called "Modified Resin Solution (4)"] of a modified resin in which the intermediate and polyurethane resin were coupled together.

No isocyanate groups were observed by an infrared absorption analysis of the modified resin obtained above. This indicates that the intermediate was grafted on the resin.

REFERENTIAL EXAMPLE 13

(Modification of Resin .... Side Chains)

After reacting 1,000 parts of polycarbonate polyol (average molecular weight: about 2,000; hydroxyl number: 56), 86 parts of ethylene glycol, 1,200 parts of methyl ethyl ketone and 509 parts of diphenylmethane diisocyanate at 70° C. for 8 hours, 2,522 parts of methyl ethyl ketone were added further. The resultant mixture was rendered uniform and then cooled to room temperature under stirring, thereby obtaining a milky white polyurethane dispersion having a solid content of 30%.

Five parts of the intermediate of Referential Example 5 were added to 100 parts of the above polyurethane dispersion. They were reacted at 70° C. for 4 hours to obtain a milky white solution [hereinafter called "Modified Resin Solution (5)"] of a modified resin in which the intermediate and polyurethane resin were coupled together.

No isocyanate groups were observed by an infrared absorption analysis of the modified resin obtained above. This indicates that the intermediate was grafted on the resin.

REFERENTIAL EXAMPLE 14

(Modification of Resin .... Backbone)

Added to 3,600 parts of methyl ethyl ketone were 1,000 parts of 1,4-butaneethylene adipate (average molecular weight: about 1,000; hydroxyl number: 112), 100 parts of a silicone compound of the below-described structure, 31 parts of 1,4-butanediol and 362 parts of diphenylmethane diisocyanate, followed by a reaction at 70° C. for 8 hours to obtain a solution of a polyurethane resin having an average molecular weight of 64,000. The solid content of the solution was 30%.

Thereafter, 130 parts of ethylene glycol and 503 parts of diphenylmethane diisocyanate were added to the above resin solution. After reacting them at 60° C. for 10 hours, 1,477 parts of methyl ethyl ketone were added further. The resultant mixture was rendered uniform and then cooled to room temperature under stirring, thereby obtaining a milky white dispersion [hereinafter called "Polyurethane Dispersion (6)"] of a polyurethane having an average molecular weight of 133,000. The particle sizes of particles formed therein were not greater than 1 μm. The solid content of the dispersion was 30%.

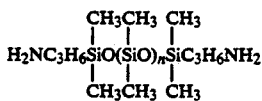

(n: a value to give a molecular weight of 5,000)

REFERENTIAL EXAMPLE 15

(Modification of Resin .... Backbone)

Added to 3,580 parts of methyl ethyl ketone were 1,000 parts of polytetramethylene glycol (average molecular weight: about 1,000; hydroxyl number: 112), 100 parts of a silicone compound of the below-described structure, 24 parts of ethylene glycol and 360 parts of diphenylmethane diisocyanate, followed by a reaction at 70° C. for 9 hours to obtain a solution of a polyurethane resin having an average molecular weight of 53,000. The solid content of the solution was 30%.

Thereafter, 116 parts of ethylene glycol and 465 parts of diphenylmethane diisocyanate were added to the above resin solution. After reacting them at 60° C. for 10 hours, 1,356 parts of methyl ethyl ketone were added further. The resultant mixture was rendered uniform and then cooled to room temperature under stirring, thereby obtaining a milky white dispersion [hereinafter called "Polyurethane Dispersion (7)"] of a polyurethane having an average molecular weight of 107,000. The particle sizes of particles formed therein were not greater than 1 μm. The solid content of the dispersion was 30%.

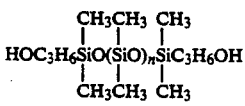

(n: a value to give a molecular weight of 5,000)

REFERENTIAL EXAMPLE 16

(Modification of Resin .... Backbone)

Added to 6,135 parts of methyl ethyl ketone were 2,000 parts of 1,6-hexamethylene adipate (average molecular weight: about 2,000; hydroxyl number: 56), 200 parts of a silicone compound of the below-described structure, 31 parts of 1,4-butanediol and 346 parts of diphenylmethane diisocyanate, followed by a reaction at 70° C. for 9 hours to obtain a solution of a polyurethane resin having an average molecular weight of 72,000. The solid content of the solution was 30%.

Thereafter, 390 parts of trimethylolpropane and 1,047 parts of diphenylmethane diisocyanate were added to the above resin solution. After reacting them at 60° C. for 10 hours, 3,353 parts of methyl ethyl ketone were added further. The resultant mixture was rendered uniform and then cooled to room temperature under stirring, thereby obtaining a milky white dispersion [hereinafter called "Polyurethane Dispersion (8)"] of a polyurethane having an average molecular weight of 178,000. The solid content of the dispersion was 30%.

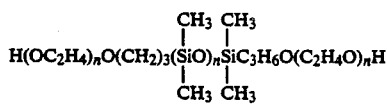

(n: a value to give a molecular weight of 5,000)

REFERENTIAL EXAMPLE 17

(Modification of Resin .... Backbone)

Added to 3,435 parts of methyl ethyl ketone were 1,000 parts of 1,4-butaneethylene adipate (average molecular weight: about 1,000; hydroxyl number: 112), 200 parts of a silicone compound of the below-described structure, 31 parts of 1,4-butanediol and 338 parts of diphenylmethane diisocyanate, followed by a reaction at 70° C. for 8 hours to obtain a solution of a polyurethane resin having an average molecular weight of 55,000. The solid content of the solution was 30%.

Thereafter, 130 parts of ethylene glycol and 542 parts of diphenylmethane diisocyanate were added to the above resin solution. After reacting them at 60° C. for 10 hours, 1,526 parts of methyl ethyl ketone were added further. The resultant mixture was rendered uniform and then cooled to room temperature under stirring, thereby obtaining a milky white dispersion [hereinafter called "Polyurethane Dispersion (9)"] of a polyurethane having an average molecular weight of 112,000. The solid content of the dispersion was 30%.

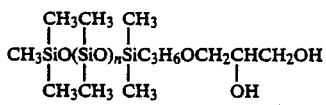

(n: a value to give a molecular weight of 5,000)

REFERENTIAL EXAMPLES 18-33

Modified polyurethane resin solutions were obtained in a similar manner as in Referential Examples 9-16 except that fluorocarbon compounds and mixtures of fluorocarbon compounds and silicone compounds, which are all given below in Table 1, were used respectively in place of the silicone compounds.

TABLE 1

| Ref. Ex. | Modification method | Fluorocarbon compound | Silicone compound | Number of modified resin soln. |
|---|---|---|---|---|
| 18 | Ref. Ex. 9 | 5 Parts of the inter- | — | 10 |

TABLE 1-continued

| Ref. Ex. | Modification method | Fluorocarbon compound | Silicone compound | Number of modified resin soln. |
|---|---|---|---|---|
| 19 | Ref. Ex. 10 | 5 Parts of the intermediate of Ref. Ex. 6 | — | 11 |
| 20 | Ref. Ex. 11 | 5 Parts of the intermediate of Ref. Ex. 7 | — | 12 |
| 21 | Ref. Ex. 12 | 5 Parts of the intermediate of Ref. Ex. 8 | — | 13 |
| 22 | Ref. Ex. 13 | 5 Parts of the intermediate of Ref. Ex. 7 | — | 14 |
| 23 | Ref. Ex. 14 | 50 Parts of a compound of the below-described structure A | — | 15 |
| 24 | Ref. Ex. 15 | 100 Parts of a compound of the below-described structure B | — | 16 |
| 25 | Ref. Ex. 16 | 100 Parts of a compound of the below-described structure C | — | 17 |
| 26 | Ref. Ex. 9 | 5 Parts of the intermediate of Ref. Ex. 1 | 5 Parts of the intermediate of Ref. Ex. 6 | 18 |
| 27 | Ref. Ex. 10 | 5 Parts of the intermediate of Ref. Ex. 2 | 5 Parts of the intermediate of Ref. Ex. 7 | 19 |
| 28 | Ref. Ex. 11 | 5 Parts of the intermediate of Ref. Ex. 3 | 5 Parts of the intermediate of Ref. Ex. 8 | 20 |
| 29 | Ref. Ex. 12 | 5 Parts of the intermediate of Ref. Ex. 4 | 5 Parts of the intermediate of Ref. Ex. 7 | 21 |
| 30 | Ref. Ex. 13 | 5 Parts of the intermediate of Ref. Ex. 5 | 5 Parts of the intermediate of Ref. Ex. 8 | 22 |
| 31 | Ref. Ex. 14 | 100 Parts of a compound of the below-described structure D | 50 Parts of a compound of the below-described structure B | 23 |
| 32 | Ref. Ex. 15 | 100 Parts of a compound of the below-described structure E | 50 Parts of a compound of the below-described structure B | 24 |
| 33 | Ref. Ex. 16 | 200 Parts of a compound of the below-described structure F | 50 Parts of a compound of the below-described structure C | 25 |

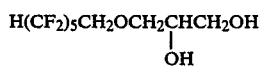

(A) $H(CF_2)_5CH_2OCH_2CHCH_2OH$
             |
             OH

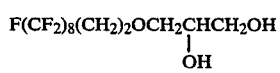

(B) $F(CF_2)_8(CH_2)_2OCH_2CHCH_2OH$
              |
              OH

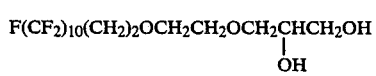

(C) $F(CF_2)_{10}(CH_2)_2OCH_2CH_2OCH_2CHCH_2OH$
                  |
                  OH

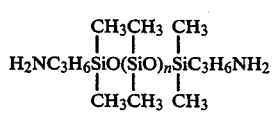

(D)
$$H_2NC_3H_6\underset{\underset{CH_3}{|}}{\overset{\overset{CH_3}{|}}{Si}}O(\underset{\underset{CH_3}{|}}{\overset{\overset{CH_3}{|}}{Si}}O)_n\underset{\underset{CH_3}{|}}{\overset{\overset{CH_3}{|}}{Si}}C_3H_6NH_2$$

(n: a value to give a molecular weight of 5,000)

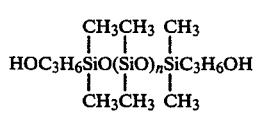

(E)
$$HOC_3H_6\underset{\underset{CH_3}{|}}{\overset{\overset{CH_3}{|}}{Si}}O(\underset{\underset{CH_3}{|}}{\overset{\overset{CH_3}{|}}{Si}}O)_n\underset{\underset{CH_3}{|}}{\overset{\overset{CH_3}{|}}{Si}}C_3H_6OH$$

(n: a value to give a molecular weight of 5,000)

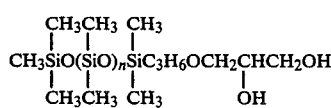

(F)
$$CH_3\underset{\underset{CH_3}{|}}{\overset{\overset{CH_3}{|}}{Si}}O(\underset{\underset{CH_3}{|}}{\overset{\overset{CH_3}{|}}{Si}}O)_n\underset{\underset{CH_3}{|}}{\overset{\overset{CH_3}{|}}{Si}}C_3H_6OCH_2CHCH_2OH$$
$$\phantom{CH_3SiO(SiO)_nSiC_3H_6OCH_2CHCH_2}|$$
$$\phantom{CH_3SiO(SiO)_nSiC_3H_6OCH_2CHCH_2}OH$$

(n: a value to give a molecular weight of 5,000)

Examples 1–25

The following polyurethane emulsions were prepared by mixing the polyurethane solutions of Referential Examples 9–33 separately along with an emulsifier, organic solvents and water in a homomixer.

Example 1: Polyurethane Emulsion (1)

| | |
|---|---|
| Polyurethane solution (1) | 100 parts |
| Urethane type emulsifier | 2 parts |
| Methyl ethyl ketone | 20 parts |
| Xylene | 20 parts |
| Water | 85 parts |

Example 2: Polyurethane Emulsion (2)

| | |
|---|---|
| Polyurethane solution (2) | 100 parts |
| Urethane type emulsifier | 2 parts |
| Methyl ethyl ketone | 20 parts |
| Toluene | 20 parts |
| Water | 80 parts |

Example 3: Polyurethane Emulsion (3)

| | |
|---|---|
| Polyurethane solution (3) | 100 parts |
| Urethane type emulsifier | 2 parts |
| Methyl ethyl ketone | 150 parts |
| Toluene | 20 parts |
| Water | 80 parts |

Example 4: Polyurethane Emulsion (4)

| | |
|---|---|
| Polyurethane solution (4) | 100 parts |
| PO/EO Block copolymer type emulsifier | 4 parts |

-continued

| | |
|---|---|
| Dioxane | 10 parts |
| Toluene | 10 parts |
| Xylene | 20 parts |
| Water | 70 parts |

Example 5: Polyurethane Emulsion (5)

| | |
|---|---|
| Polyurethane solution (5) | 100 parts |
| Urethane type emulsifier | 1 part |
| Methyl isobutyl ketone | 20 parts |
| Toluene | 20 parts |
| Water | 75 parts |

Example 6: Polyurethane Emulsion (6)

| | |
|---|---|
| Polyurethane solution (6) | 100 parts |
| PO/EO Block copolymer type emulsifier | 1 part |
| tetrahydrofuran | 20 parts |
| Toluene | 20 parts |
| Water | 60 parts |

Example 7: Polyurethane Emulsion (7)

| | |
|---|---|
| Polyurethane solution (7) | 100 parts |
| Urethane type emulsifier | 2 parts |
| Methyl ethyl ketone | 20 parts |
| Xylene | 20 parts |
| Water | 85 parts |

Example 8: Polyurethane Emulsion (8)

| | |
|---|---|
| Polyurethane solution (8) | 100 parts |
| Urethane type emulsifier | 2 parts |
| Methyl ethyl ketone | 20 parts |
| Toluene | 20 parts |
| Water | 80 parts |

Example 9: Polyurethane Emulsion (9)

| | |
|---|---|
| Polyurethane solution (9) | 100 parts |
| Urethane type emulsifier | 2 parts |
| Methyl ethyl ketone | 150 parts |
| Toluene | 20 parts |
| Water | 80 parts |

Example 10: Polyurethane Emulsion (10)

| | |
|---|---|
| Polyurethane solution (10) | 100 parts |
| Urethane type emulsifier | 2 parts |
| Methyl ethyl ketone | 20 parts |
| Xylene | 20 parts |
| Water | 85 parts |

Example 11: Polyurethane Emulsion (11)

| | |
|---|---|
| Polyurethane solution (11) | 100 parts |
| Urethane type emulsifier | 2 parts |
| Methyl ethyl ketone | 20 parts |
| Toluene | 20 parts |
| Water | 80 parts |

Example 12: Polyurethane Emulsion (12)

| | |
|---|---|
| Polyurethane solution (12) | 100 parts |
| Urethane type emulsifier | 2 parts |
| Methyl ethyl ketone | 150 parts |
| Toluene | 20 parts |
| Water | 80 parts |

Example 13: Polyurethane Emulsion (13)

| | |
|---|---|
| Polyurethane solution (13) | 100 parts |
| PO/EO Block copolymer type emulsifier | 4 parts |
| Dioxane | 10 parts |
| Toluene | 10 parts |
| Xylene | 20 parts |
| Water | 70 parts |

Example 14: Polyurethane Emulsion (14)

| | |
|---|---|
| Polyurethane solution (14) | 100 parts |
| Urethane type emulsifier | 1 part |
| Methyl isobutyl ketone | 20 parts |
| Toluene | 20 parts |
| Water | 75 parts |

Example 15: Polyurethane Emulsion (15)

| | |
|---|---|
| Polyurethane solution (15) | 100 parts |
| PO/EO Block copolymer type emulsifier | 1 part |
| Tetrahydrofuran | 20 parts |
| Toluene | 20 parts |
| Water | 60 parts |

Example 16: Polyurethane Emulsion (16)

| | |
|---|---|
| Polyurethane solution (16) | 100 parts |
| Urethane type emulsifier | 2 parts |
| Methyl ethyl ketone | 20 parts |
| Xylene | 20 parts |
| Water | 85 parts |

Example 17: Polyurethane Emulsion (17)

| | |
|---|---|
| Polyurethane solution (17) | 100 parts |
| Urethane type emulsifier | 2 parts |
| Methyl ethyl ketone | 20 parts |
| Toluene | 20 parts |
| Water | 80 parts |

Example 18: Polyurethane Emulsion (18)

| | |
|---|---|
| Polyurethane solution (18) | 100 parts |
| Urethane type emulsifier | 2 parts |
| Methyl ethyl ketone | 20 parts |
| Xylene | 20 parts |
| Water | 85 parts |

Example 19: Polyurethane Emulsion (19)

| | |
|---|---|
| Polyurethane solution (19) | 100 parts |
| Urethane type emulsifier | 2 parts |
| Methyl ethyl ketone | 20 parts |
| Toluene | 20 parts |
| Water | 80 parts |

Example 20: Polyurethane Emulsion (20)

Example 21: Polyurethane Emulsion (21)

| Polyurethane solution (20) | 100 parts |
|---|---|
| Urethane type emulsifier | 2 parts |
| Methyl ethyl ketone | 150 parts |
| Toluene | 20 parts |
| Water | 80 parts |

Example 21: Polyurethane Emulsion (21)

| Polyurethane solution (21) | 100 parts |
|---|---|
| PO/EO Block copolymer type emulsifier | 4 parts |
| Dioxane | 10 parts |
| Toluene | 10 parts |
| Xylene | 20 parts |
| Water | 70 parts |

Example 22: Polyurethane Emulsion (22)

| Polyurethane solution (22) | 100 parts |
|---|---|
| Urethane type emulsifier | 1 part |
| Methyl isobutyl ketone | 20 parts |
| Toluene | 20 parts |
| Water | 75 parts |

Example 23: Polyurethane Emulsion (23)

| Polyurethane solution (23) | 100 parts |
|---|---|
| PO/EO Block copolymer type emulsifier | 1 part |
| Tetrahydrofuran | 20 parts |
| Toluene | 20 parts |
| Water | 60 parts |

Example 24: Polyurethane Emulsion (24)

| Polyurethane solution (24) | 100 parts |
|---|---|
| Urethane type emulsifier | 2 parts |
| Methyl ethyl ketone | 20 parts |
| Xylene | 20 parts |
| Water | 85 parts |

Example 25: Polyurethane Emulsion (25)

| Polyurethane solution (25) | 100 parts |
|---|---|
| Urethane type emulsifier | 2 parts |
| Methyl ethyl ketone | 20 parts |
| Toluene | 20 parts |
| Water | 80 parts |

Comparative Examples 1-9

Polyurethane emulsions of Comparative Examples 1-9 were prepared in a similar manner as in Examples 1-9 except that polyurethane resin solutions obtained in the same manner as in Referential Examples 9-17 but containing no silicone segments were used respectively instead of the polyurethane resins containing silicone segments.

Properties of the polyurethane emulsions of Examples 1-25 and Comparative Examples 1-9 are summarized in Table 2.

TABLE 2

| Emulsion No. | Viscosity (25° C., cps) | Solid content (%) |
|---|---|---|
| Example 1 | 22,000 | 14.1 |
| 2 | 17,000 | 14.4 |
| 3 | 130 | 9.2 |
| 4 | 21,000 | 15.1 |
| 5 | 20,000 | 14.4 |
| 6 | 15,000 | 15.4 |
| 7 | 20,000 | 14.1 |
| 8 | 15,000 | 14.4 |
| 9 | 180 | 9.2 |
| 10 | 20,000 | 14.2 |
| 11 | 18,500 | 14.5 |
| 12 | 150 | 9.3 |
| 13 | 21,500 | 15.0 |
| 14 | 21,000 | 14.3 |
| 15 | 16,100 | 15.5 |
| 16 | 20,500 | 14.0 |
| 17 | 14,500 | 14.4 |
| 18 | 21,000 | 14.2 |
| 19 | 17,500 | 14.4 |
| 20 | 140 | 9.2 |
| 21 | 22,000 | 14.9 |
| 22 | 20,000 | 14.4 |
| 23 | 14,600 | 15.5 |
| 24 | 21,000 | 14.2 |
| 25 | 15,200 | 14.5 |
| Comp. Ex. 1 | 21,000 | 14.2 |
| 2 | 16,000 | 14.4 |
| 3 | 140 | 9.2 |
| 4 | 20,000 | 14.9 |
| 5 | 19,000 | 14.4 |
| 6 | 16,000 | 15.5 |
| 7 | 19,000 | 14.2 |
| 8 | 17,000 | 14.5 |
| 9 | 160 | 9.2 |

The stability of each of the above emulsions did not vary over 3 months.

Examples 26-50

Various sheet-like porous materials having properties, which will be described below in Table 4, were obtained respectively by impregnating and/or coating various base materials with the polyurethane emulsions shown in Table 2 and then drying the thus-impregnated and/or coated base materials under conditions summarized below in Table 3. Comparative Examples 10-18 were conducted under the same conditions as Examples 26-34.

TABLE 3

| Ex. | Emulsion No. | Base material | Coated/impregnated amount | Drying conditions |
|---|---|---|---|---|
| 26 | 1 | Parting paper | Coated at 200 g/m² | 80° C. × 2 min + 125° C. × 2 min |
| 27 | 2 | Parting paper | Coated at 200 g/m² | 80° C. × 2 min + 125° C. × 2 min |
| 28 | 3 | Nonwoven fabric | Impregnated at 1000 g/m² | 90° C. × 3 min + 140° C. × 3 min |
| 29 | 4 | Cotton fabric | Coated at 400 g/m² | 140° C. × 3 min |
| 30 | 5 | Nylon taffeta | Coated at 200 g/m² | 80° C. × 2 min + 125° C. × 2 min |
| 31 | 6 | Tufted T/R fabric | Coated at 600 g/m² | 120° C. × 4 min |
| 32 | 7 | Polyester taffeta | Coated at 200 g/m² | 140° C. × 2 min |
| 33 | 8 | Tufted T/R fabric | Coated at 600 g/m² | 120° C. × 4 min |
| 34 | 9 | Nonwoven fabric | Impregnated at 1000 g/m² | 120° C. × 5 min |
| 35 | 10 | Parting paper | Coated at 200 g/m² | 80° C. × 2 min + 125° C. × 2 min |
| 36 | 11 | Parting paper | Coated at 200 g/m² | 80° C. × 2 min + 125° C. × 2 min |
| 37 | 12 | Nonwoven fabric | Impregnated at 1000 g/m² | 90° C. × 3 min + 140° C. × 3 min |
| 38 | 13 | Cotton fabric | Coated at 400 g/m² | 140° C. × 3 min |

TABLE 3-continued

| Ex. | Emulsion No. | Base material | Coated/impregnated amount | Drying conditions |
|---|---|---|---|---|
| 39 | 14 | Nylon taffeta | Coated at 200 g/m² | 80° C. × 2 min + 125° C. × 2 min |
| 40 | 15 | Tufted T/R fabric | Coated at 600 g/m² | 120° C. × 4 min |
| 41 | 16 | Polyester taffeta | Coated at 200 g/m² | 140° C. × 2 min |
| 42 | 17 | Tufted T/R fabric | Coated at 600 g/m² | 120° C. × 4 min |
| 43 | 18 | Parting paper | Coated at 200 g/m² | 80° C. × 2 min + 125° C. × 2 min |
| 44 | 19 | Parting paper | Coated at 200 g/m² | 80° C. × 2 min + 125° C. × 2 min |
| 45 | 20 | Nonwoven fabric | Impregnated at 1000 g/m² | 90° C. × 3 min + 140° C. × 3 min |
| 46 | 21 | Cotton fabric | Coated at 400 g/m² | 140° C. × 3 min |
| 47 | 22 | Nylon taffeta | Coated at 200 g/m² | 80° C. × 2 min + 125° C. × 2 min |
| 48 | 23 | Tufted T/R fabric | Coated at 600 g/m² | 120° C. × 3 min |
| 49 | 24 | Polyester taffeta | Coated at 200 g/m² | 140° C. × 4 min |
| 50 | 25 | Tufted T/R fabric | Coated at 600 g/m² | 120° C. × 4 min |

TABLE 4

| Property | I | II | III | IV | V Before | V After |
|---|---|---|---|---|---|---|
| 26 | 550 | ○ | 9550 | — | 100 | 70 |
| 27 | 410 | ○ | 9370 | — | 100 | 70 |
| 28 | 450 | ○ | 6930 | 6000 | 100 | 50 |
| 29 | 380 | ○ | 8560 | 6500 | 100 | 70 |
| 30 | 450 | ○ | 6520 | 4500 | 100 | 50 |
| 31 | 350 | ○ | 7230 | 6000 | 100 | 70 |
| 32 | 400 | ○ | 7520 | 5000 | 100 | 50 |
| 33 | 370 | ○ | 8100 | 6200 | 100 | 50 |
| 34 | 570 | ○ | 8210 | 6000 | 100 | 70 |
| 35 | 570 | ○ | 8250 | — | 100 | 70 |
| 36 | 450 | ○ | 8570 | — | 100 | 70 |
| 37 | 500 | ○ | 6140 | 6000 | 100 | 50 |
| 38 | 400 | ○ | 8210 | 6500 | 100 | 70 |
| 39 | 510 | ○ | 6100 | 4500 | 100 | 50 |
| 40 | 620 | ○ | 7000 | 6000 | 100 | 70 |
| 41 | 600 | ○ | 7120 | 5000 | 100 | 50 |
| 42 | 650 | ○ | 7600 | 6200 | 100 | 50 |
| 43 | 580 | ○ | 9150 | — | 100 | 70 |
| 44 | 510 | ○ | 9070 | — | 100 | 70 |
| 45 | 530 | ○ | 6230 | 6000 | 100 | 70 |
| 46 | 450 | ○ | 8360 | 6500 | 100 | 70 |
| 47 | 520 | ○ | 6510 | 4500 | 100 | 70 |
| Example |  |  |  |  |  |  |
| 48 | 650 | ○ | 7180 | 6000 | 100 | 70 |
| 49 | 630 | ○ | 7080 | 5000 | 100 | 50 |
| 50 | 660 | ○ | 7590 | 6500 | 100 | 70 |
| Comparative Example |  |  |  |  |  |  |
| 10 | 30 | ○ | 6270 | — | 0 | 0 |
| 11 | 25 | ○ | 5820 | — | 0 | 0 |
| 12 | 35 | △ | 4050 | 4500 | 0 | 0 |
| 13 | 40 | X | 5800 | 5000 | 0 | 0 |
| 14 | 30 | X | 2960 | 3500 | 0 | 0 |
| 15 | 28 | △ | 6100 | 5000 | 0 | 0 |
| 16 | 37 | X | 6890 | 3500 | 0 | 0 |
| 17 | 31 | X | 5120 | 5000 | 0 | 0 |
| 18 | 28 | △ | 6620 | 5000 | 0 | 0 |

Note:
I Surface smoothness (surface durability): Each resin layer was rubbed with gauze under a load of 500 g. Its surface smoothness is expressed in terms of strokes counted until the resin layer was broken.
II Hand and feeling: ○: soft, △: slightly hard, X: hard.
III Moisture permeability (g/m² · 24 hrs, measured by the procedure prescribed in JIS Z-0208B).
IV Withstandable water pressure (mm $H_2O$).
V Washability (water repellancy both before and after washing).

We claim:

1. A polyurethane emulsion comprising:
   an organic solvent solution of a polyurethane resin containing silicone segments and/or fluorocarbon segments as backbones and/or side chains; and
   water emulsified in the organic solvent solution.

2. The polyurethane emulsion as claimed in claim 1, wherein the silicone segments and fluorocarbon segments amount to 0.2–50 wt.% of the whole polyurethane resin.

3. In a sheet-like porous material having a porous layer of a polyurethane resin provided on a base material, the improvement wherein the polyurethane resin has silicone segments and/or fluorocarbon segments as backbones and/or side chains.

4. The sheet-like porous material as claimed in claim 3, wherein the silicone segments and fluorocarbon segments amount to 0.2–50 wt.% of the whole polyurethane resin.

5. In a process for producing a sheet-like porous material by impregnating and/or coating a base material with a water-in-oil type polyurethane emulsion and then gelling and drying the emulsion, the improvement wherein the polyurethane emulsion comprises:
   an organic solvent solution of a polyurethane resin containing silicone segments and/or fluorocarbon segments as backbones and/or side chains; and
   water emulsified in the organic solvent solution.

6. The process as claimed in claim 5, wherein the silicone segments and fluorocarbon segments amount to 0.2–50 wt.% of the whole polyurethane resin.

* * * * *